US012687912B2

(12) United States Patent
Mutter et al.

(10) Patent No.: US 12,687,912 B2
(45) Date of Patent: Jul. 21, 2026

(54) TRANSMITTING/RECEIVING DEVICE FOR SELECTIVELY WAKING UP A SUBSCRIBER STATION OF A SERIAL BUS SYSTEM AND METHOD FOR SELECTIVELY WAKING UP A SUBSCRIBER STATION IN A SERIAL BUS SYSTEM

(71) Applicant: Robert Bosch GmbH, Stuttgart (DE)

(72) Inventors: Arthur Mutter, Neuhausen (DE);
Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 126 days.

(21) Appl. No.: 18/888,525

(22) Filed: Sep. 18, 2024

(65) Prior Publication Data

US 2025/0130619 A1 Apr. 24, 2025

(30) Foreign Application Priority Data

Oct. 19, 2023 (DE) ...................... 10 2023 210 269.2

(51) Int. Cl.
| | |
|---|---|
| *G06F 1/32* | (2019.01) |
| *G06F 1/3209* | (2019.01) |
| *G06F 13/42* | (2006.01) |
| *H04L 12/40* | (2006.01) |

(52) U.S. Cl.
CPC ........ *G06F 1/3209* (2013.01); *G06F 13/4282* (2013.01); *H04L 12/40039* (2013.01)

(58) Field of Classification Search
CPC ..................................... G06F 1/32; G06F 9/44
See application file for complete search history.

(56) References Cited

U.S. PATENT DOCUMENTS

| | | | | |
|---|---|---|---|---|
| 2011/0317600 | A1* | 12/2011 | Thomson ............... | H04B 1/005 |
| | | | | 370/311 |
| 2017/0212720 | A1* | 7/2017 | Moriguchi ................ | G06F 3/16 |
| 2018/0109946 | A1* | 4/2018 | Mosenia ............... | H04W 12/06 |

OTHER PUBLICATIONS

ISO 11898-1:2015 Standard, "Road Vehicles—Controller Area Network (CAN)—Part 1: Data Link Layer and Physical Signalling," 2015, pp. 1-74.
ISO 11898-1:2016 Standard, "Road Vehicles—Controller Area Network (CAN)—Part 2: High-Spped Medium Access Unit," 2016, pp. 1-40.

* cited by examiner

*Primary Examiner* — Keshab R Pandey
(74) *Attorney, Agent, or Firm* — NORTON ROSE FULBRIGHT US LLP

(57) ABSTRACT

A transmitting/receiving device for selectively waking up a subscriber station of a serial bus system. The transmitting/receiving device has a transmitting module for transmitting a transmission signal created for communication in the bus system based on a frame, as an analog signal to a bus, a receiving module for receiving an analog signal from the bus and for generating a digital received signal from the analog signal received from the bus, and a wake-up module for waking up the subscriber station after the subscriber station has been put to sleep to save energy. The wake-up module is configured to evaluate at least one wake-up condition to decide whether or not the digital received signal corresponds to a wake-up frame which sends instructions to activate the transmitting module to wake up the subscriber station.

13 Claims, 6 Drawing Sheets start create wake-up
frame and transmit
it via the bus — S1 receive wake-up
frame and wake up — S2 send subscriber
station back to sleep — S3 receive sleep frame
and go to sleep — S4 end start create wake-up
frame and transmit
via the bus — S11 receive wake-up
frame and wake up — S12 communicate — S13 end

TRANSMITTING/RECEIVING DEVICE FOR SELECTIVELY WAKING UP A SUBSCRIBER STATION OF A SERIAL BUS SYSTEM AND METHOD FOR SELECTIVELY WAKING UP A SUBSCRIBER STATION IN A SERIAL BUS SYSTEM

CROSS REFERENCE

The present application claims the benefit under 35 U.S.C. § 119 of German Patent Application No. DE 10 2023 210 269.2 filed on Oct. 19, 2023, which is expressly incorporated herein by reference in its entirety.

FIELD

The present invention relates to a transmitting/receiving device for selectively waking up a subscriber station of a serial bus system, and to a method for selectively waking up a subscriber station in a serial bus system.

BACKGROUND INFORMATION

Bus systems are used in many fields of technology for communication between technical devices, such as sensors and controllers. In some bus systems, technical devices are intended to communicate with one another, said devices optionally being able to switch as required between different standards and/or rates for data transmission or communication between the subscriber stations of the bus system.

Currently, Classical CAN and/or CAN FD, which are both standardized in the international standard ISO 11898-1: 2015, are used for communication between devices in vehicles and/or in other technical devices. CAN XL can also be used, which is specified in CiA610-1 and is currently being integrated into ISO 11898-1. In such CAN-bus-based communication, a frame is used for generating a transmission signal, the frame being divided into an arbitration phase and a data phase. In the arbitration phase, negotiations are held between the subscriber stations of the bus system as to which of the subscriber stations of the bus system will get exclusive access to the bus in the following data phase and then be allowed to send its data to the bus. In CAN FD and in CAN XL, the bits of the transmission signal are generated and sent to the bus with a shorter bit time in the data phase than in the arbitration phase—in other words, with a higher bit rate. With the aid of SIC and SIC XL transmitting/receiving devices, which are also called transceivers, bit rates up to 8 Mbit/s are possible with CAN FD and bit rates up to 20 Mbit/s with CAN XL in the data phase. By contrast, the bit rate remains at approximately 500 kbit/s in the arbitration phase in order to make arbitration possible.

In order to reduce the energy consumption of a system, for example a vehicle, etc., subscriber stations on a CAN bus that are not currently needed should be put to sleep and woken up again when required. The wake-up can either be carried out with a predetermined wake-up pattern which all subscriber stations on the bus recognize and, as a result, participate in communication on the bus again. Otherwise, the wake-up signal is transmitted by a management subscriber station and is configured in such a way that at least individual subscriber stations of the bus can be woken up individually or selectively. Usually, the wake-up is executed using a CAN transmitting/receiving device (transceiver) which detects such a wake-up signal in a Classical CAN frame. This is described in the international standard ISO 11898-2:2016. Here, the term "wake-up signal" is understood to mean that the "wake-up signal" comes from the management subscriber station and is therefore the CAN frame. The CAN frame is recognized by the transceiver of the subscriber station to be woken up as a "wake-up signal." It could also be said that the transceiver detects the wake-up signal on the CAN bus, converts it and then forwards it to the rest of the subscriber station (node).

Selective wake-up is possible in a resource-efficient implementation using Classical CAN frames and the highly tolerant, and thus cost-effective, clock source which can be used for this purpose.

However, a problem arises when bit rates of more than 8 Mbit/s are to be used in the bus system, for which transmission signal(s) based on CAN XL frames must be used. However, for such bit rates, CAN XL must be operated using SIC XL transceivers and error signaling must be deactivated in CAN XL communication. This means that CAN XL automatically loses compatibility with CAN FD and Classical CAN. As a result, communication on the bus is only possible using CAN XL. This has the disadvantage that selective wake-up can no longer be used with Classical CAN frames.

Another problem is that using a CAN XL frame for selective wake-up would be very expensive compared to a Classical CAN frame. The reason for this is the precise clock required for CAN XL and the significantly higher complexity of the CAN XL protocol.

SUMMARY

Therefore, it is an object of the present invention to provide a transmitting/receiving device for selectively waking up a subscriber station of a serial bus system, and a method for selectively waking up a subscriber station in a serial bus system, which solve the aforementioned problems. In particular, a transmitting/receiving device for selectively waking up a subscriber station of a serial bus system and a method for selectively waking up a subscriber station in a serial bus system are to be provided, in which it is possible to selectively wake up the individual subscriber stations in a simple and cost-effective manner even when using different communication standards and bit rates in the arbitration and data phases for all (currently) possible bit rates.

The object may be achieved by a transmitting/receiving device for selectively waking up subscriber stations of a serial bus system having certain features of the present invention. According to an example embodiment of the present invention, the transmitting/receiving device has a transmitting module for transmitting a transmission signal, which is created for communication in the bus system on the basis of a frame, as an analog signal to the bus of the bus system, a receiving module for receiving the analog signal from the bus of the bus system and for generating a digital received signal from the analog signal received from the bus, and a wake-up module for waking up the subscriber station after the subscriber station has been put to sleep to save energy, wherein the wake-up module is configured to evaluate at least one wake-up condition in order to decide whether or not the digital received signal corresponds to a wake-up frame which sends instructions to activate the transmitting module to wake up the subscriber station, and wherein the wake-up module is configured to make the decision as to whether or not the digital received signal corresponds to the wake-up frame before the receiving module serially forwards a data field encoded in the digital received signal for useful data of the frame to the wake-up module.

The configuration of the described transmitting/receiving device allows at least one subscriber station of a serial bus system to be selectively woken up using a configuration which can be used independently of the bit rate possible in the bus system.

The described transmitting/receiving device according to the present invention can therefore use the same frame in the bus system at bit rates below 8 Mbit/s and at bit rates of more than 8 Mbit/s. Switching the type of selective wake-up is therefore not necessary even with an increased bit rate.

One reason for the simple and therefore cost-effective implementation of selective wake-up is that the described transmitting/receiving device does not have to be able to decode the short bits of the CAN XL data phase individually.

Very advantageously, the costs for the described transmitting/receiving device (wake-up transceiver) remain low, even lower than for Classical CAN wake-up frames. One reason for this is that the complexity of the wake-up method performed by the transmitting/receiving device is lower than that of Classical CAN. Another reason for this is that a clock source with a high tolerance, and thus a low accuracy, is sufficient for the transmitting/receiving device.

This means that CAN XL can be operated in the data phase with SIC XL transmitting/receiving devices (transceivers) for high bit rates of up to 20 Mbit/s and error signaling can be deactivated in the case of CAN XL. Nevertheless, in this case the previously described possibility for cost-effective selective wake-up is available.

Overall, the bus system can thus be operated in a very energy-efficient and therefore cost-effective manner due to the high bit rate which can be used in the data phase and the resulting increased possibility of selectively putting individual subscriber stations of the bus system to sleep.

The described transmitting/receiving device according to the present invention also makes it possible for at least two subscriber stations to be present in the bus system, which stations send messages to the bus according to different CAN standards. In the bus system, for example, in addition to two CAN XL subscriber stations, at least one other subscriber station can thus also be present which sends messages to the bus according to a different CAN standard.

Advantageous further example embodiments of the transmitting/receiving device are disclosed herein.

According to one option of the present invention, the at least one wake-up condition is a priority ID, which determines the temporal priority with which the frame was allowed to be transmitted to the bus.

According to another option of the present invention, the at least one wake-up condition is a single bit arranged directly after the priority ID in the received frame.

The received frame is possibly a CAN XL frame and the single bit is possibly the RRS bit.

According to yet another option of the present invention, the wake-up module is configured to only carry out the wake-up if the wake-up module has evaluated that a wake-up frame was received with the serially received digital received signals N times in a predetermined period of time, wherein N is a natural number greater than 1.

According to an example embodiment of the present invention, the wake-up module can comprise a decoding block for decoding the received signal output by the receiving module on the basis of the frame, based on which the analog signal was created on the bus of the bus system, and an evaluation block for evaluating the result output by the decoding block as to whether or not the digital received signal corresponds to the wake-up frame.

According to an example embodiment of the present invention, the wake-up module can also have a configuration block for storing the at least one wake-up condition, wherein the evaluation block is configured to carry out its evaluation by accessing the configuration block and to generate a signal for activating the power supply for the transmitting module when the digital received signal corresponds to the wake-up frame.

The above-described transmitting/receiving device can be part of a subscriber station which also has a communication control device which is configured to sample and evaluate the received signal generated by the transmitting/receiving device according to a predetermined frame.

The communication control device can be configured to control a communication of the subscriber station with at least one other subscriber station of the bus system and to evaluate the received signal, in which the bit time in a first communication phase can differ from a bit time in a second communication phase.

The communication control device can also be configured to, in the first communication phase, negotiate with the other subscriber stations as to which of the subscriber stations of the bus system will be given at least temporarily exclusive, collision-free access to the bus in the subsequent second communication phase.

It is possible that the subscriber station is configured to transmit a wake-up frame to the bus of the bus system in order to selectively wake up at least one other subscriber station of the bus system after it has been put to sleep.

In addition, a bus system is possible which has a bus, a first subscriber station which is configured to transmit a wake-up frame to the bus of the bus system, as described above, and at least one second subscriber station, as also described above, which is connected to the first subscriber station via the bus in such a way that the subscriber stations can communicate with each other serially.

The aforementioned object may also be achieved by a method for selectively waking up a subscriber station in a serial bus system having certain features of the present invention. The method is carried out by means of a transmitting/receiving device which has a transmitting module, a receiving module and a wake-up module, wherein the method comprises the steps of transmitting, by means of the transmitting module, a transmission signal, which is created for communication in the bus system on the basis of a frame, as an analog signal to the bus of the bus system; receiving, by means of the receiving module, the analog signal from the bus of the bus system; generating, by means of the receiving module, a digital received signal from the analog signal received from the bus; waking up, by means of the wake-up module, the subscriber station after the subscriber station has been put to sleep to save energy, wherein the wake-up module evaluates at least one wake-up condition in order to decide whether or not the digital received signal corresponds to a wake-up frame which sends instructions to activate the transmitting module to wake up the subscriber station, and wherein the wake-up module makes the decision as to whether or not the digital received signal corresponds to the wake-up frame before the receiving module serially forwards a data field encoded in the digital received signal for useful data of the frame to the wake-up module.

The method of the present invention offers the same advantages as those mentioned above in relation to the transmitting/receiving device of the present invention.

Further possible implementations of the present invention also include combinations, even those not explicitly mentioned, of features or embodiments described above or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the figures and on the basis of exemplary embodiments.

In the figures, identical or functionally identical elements are provided with the same reference signs unless otherwise indicated.

DETAILED DESCRIPTION OF EXAMPLE EMBODIMENTS

Figure 1:
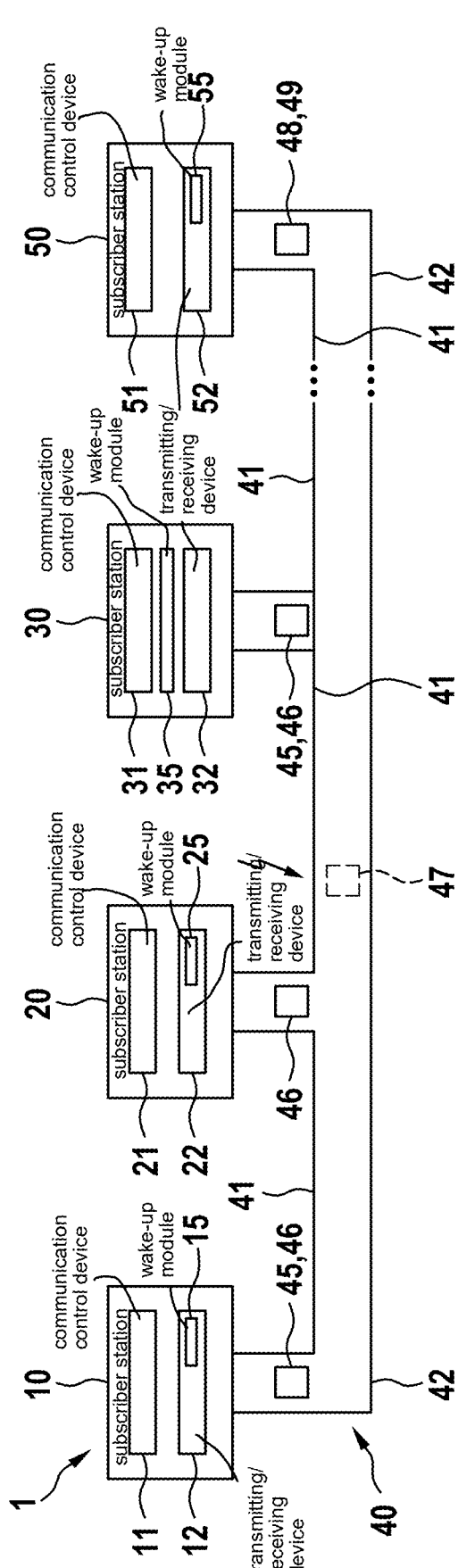
FIG. 1 shows a simplified block diagram of a bus system according to a first exemplary embodiment of the present invention.

FIG. 1 shows a bus system 1 as an example, which is in particular fundamentally designed for a CAN bus system, a CAN FD bus system, a CAN XL bus system, and/or modifications thereof, as described below. The bus system 1 can be used in a vehicle, in particular a motor vehicle, an aircraft, etc., or in a hospital, etc.

In FIG. 1, the bus system 1 has a plurality of subscriber stations 10, 20, 30, 50, which are each connected to a bus 40 having a first bus wire 41 and a second bus wire 42. The bus wires 41, 42 can also be referred to as CAN_H and CAN_L and are used for electrical signal transmission after the coupling-in of the dominant levels or generation of recessive levels or other levels for a signal in the transmission state. Messages 45, 46 in the form of signals can be transmitted between the individual subscriber stations 10, 20, 30, 50 in series via the bus 40. If an error occurs during communication on the bus 40, as shown by the jagged black block arrow in FIG. 1, an error frame 47 having an error flag and an error delimiter can optionally be transmitted. The subscriber stations 10, 20, 30 of FIG. 1 are, for example, control devices, sensors, display devices, etc. of a motor vehicle or of another technical system.

The subscriber station 50 can also be referred to as a manager subscriber station or manager node or selective wake-up subscriber station. The subscriber station 50 is also configured to transmit a wake-up frame 48 for selectively waking up one of the subscriber stations 10, 20, 30 via the bus 40, as required. The wake-up frame 48 can also be referred to as WUF for short. Optionally, the subscriber station 50 is also configured to transmit a sleep frame 49 for selectively putting one of the subscriber stations 10, 20, 30 to sleep via the bus 40, as required.

As shown in FIG. 1, the subscriber station 10 has a communication control device 11, a transmitting/receiving device 12 and a wake-up module 15. The subscriber station 20 has a communication control device 21, a transmitting/receiving device 22 and a wake-up module 25. The subscriber station 30 has a communication control device 31, a transmitting/receiving device 32 and a wake-up module 35. The subscriber station 50 has a communication control device 51, a transmitting/receiving device 52 and a management module 55. The transmitting/receiving devices 12, 22, 32, 52 of the subscriber stations 10, 20, 30, 50 are each directly connected to the bus 40, even if this is not illustrated in FIG. 1.

The communication control devices 11, 21, 31, 51 are each used for controlling a communication of the relevant subscriber station 10, 20, 30, 50 via the bus 40 with at least one other subscriber station of the subscriber stations 10, 20, 30, 50 which are connected to the bus 40. For this purpose, the communication control devices 11, 31 create and/or read first messages 45 which are, for example, CAN FD messages 45. The CAN FD messages 45 are formed on the basis of a CAN FD format, which is described in more detail with reference to FIG. 2.

The communication control devices 11, 31, 51 may further be designed to provide or receive a CAN FD message 45 or a CAN XL message 46 to or from the associated transmitting/receiving device 12, 32, 52, as required. The CAN XL messages 46 are formed on the basis of a CAN XL format, which is described in more detail with reference to FIG. 3. The communication control devices 11, 31, 51 thus create and read a first message 45 or a second message 46, wherein the first and the second message 45, 46 differ in their data transmission standard, specifically in this case CAN FD or CAN XL.

The communication control device 21 can be designed as a conventional CAN controller according to ISO 11898-1:2015, i.e., as a CAN FD-tolerant Classical CAN controller or a CAN FD controller. The communication control device 21 creates and reads first messages 45, for example CAN FD messages 45. In the case of the CAN FD messages 45, a number of 0 to 64 data bytes can be included, which are in addition transmitted at a significantly faster data rate than in the case of a Classical CAN message. In particular, the communication control device 21 is designed as a conventional CAN FD controller.

The transmitting/receiving devices 12, 32, 52 can be designed in order to provide messages 45 according to the CAN FD format or messages 46 according to the current CAN XL format for the associated communication control device 11, 31, 52 or to receive them from the latter as required. In addition, the wake-up modules 15, 35, which are described in more detail below, are available.

The transmitting/receiving device 22 can be designed as a conventional CAN transmitting/receiving device according to ISO 11898-1:2015 or a CAN FD transmitting/receiving device. In addition, the wake-up module 25 which can be designed according to the international standard ISO 11898-2:2016, as explained in more detail below, is available.

The wake-up modules 15, 35 can also be configured to receive and read a wake-up frame which is designed in accordance with the international standard ISO 11898-2: 2016.

By means of the subscriber stations 10, 30, 50, a formation and then a transmission of messages 46 with the CAN XL format and the reception of such messages 46 can be realized.

Figure 2:
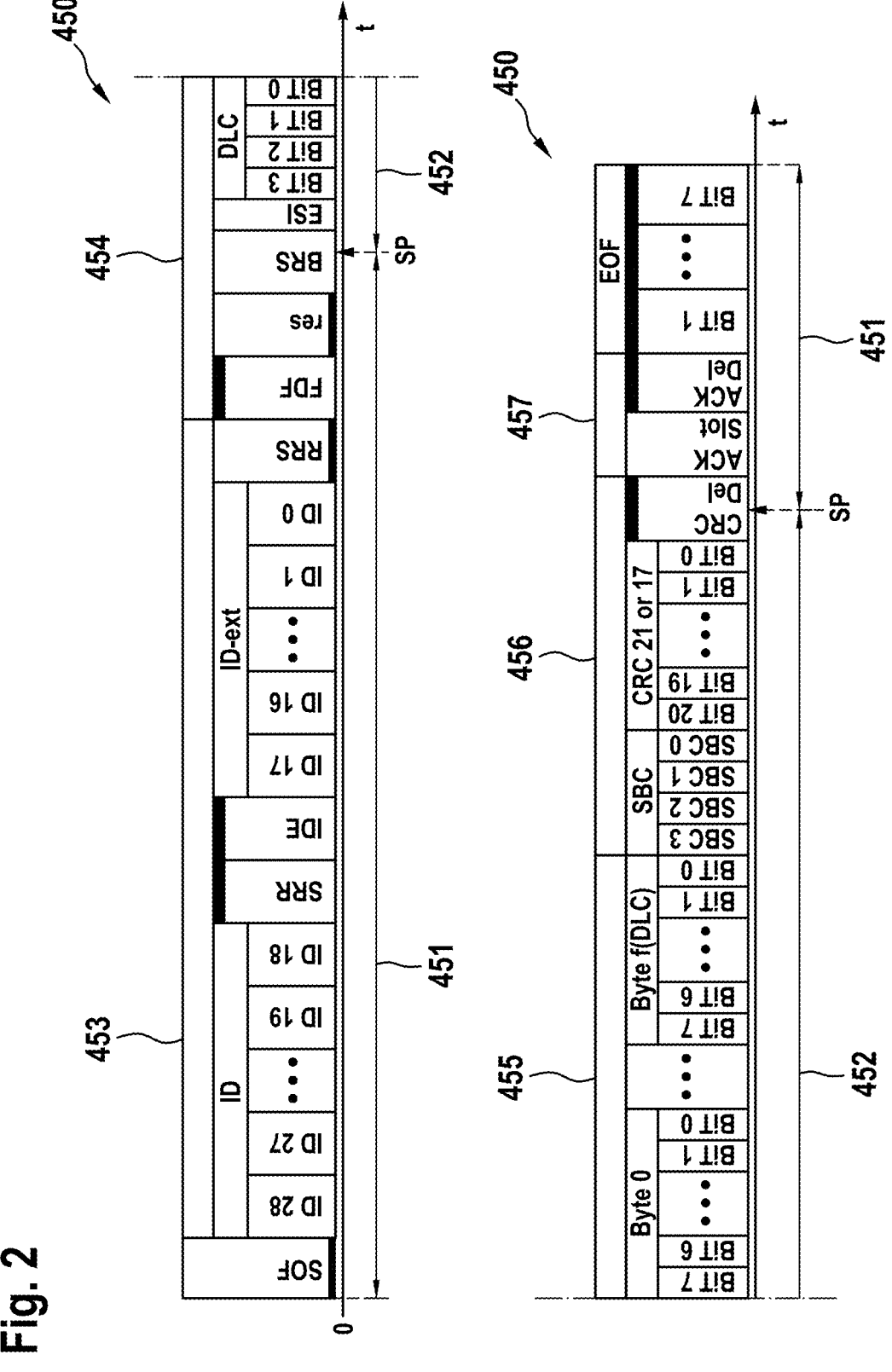
FIG. 2 shows the format of CAN FD frames according to the aforementioned standard ISO 11898-1:2015 for a message that can be transmitted from a transmitting/receiving device for a subscriber station of the bus system according to the first exemplary embodiment of the present invention.

FIG. 2 shows a frame 450 created by one of the subscriber stations 10, 20, 30, 50 for a message 45 with up to 64 data bytes in the CAN FD format. The CAN FD frame 450 is provided by one of the communication control devices 11, 21, 31, 51, specifically encoded in a digital transmission signal TxD (FIG. 4), for the associated transmitting/receiving device 12, 22, 32, 52 for transmitting to the bus 40.

The frame 450 is divided into two communication phases, which are called the arbitration phase 451 and the data phase 452. The frame 450 begins and ends in the arbitration phase 451. The frame 450 begins with an SOF bit and has an arbitration field 453, a control field 454, a data field 455, a checksum field 456 (CRC field), a confirmation field 457 (ACK=acknowledge), and an end of frame field EOF (EOF=end of frame). Bits in the arbitration phase 451 of the frame 450 have a longer bit time than bits of the data phase 452, as illustrated in FIG. 2 by way of example.

Bits shown with a thick line on their lower line in FIG. 2 are transmitted in the frame 450 as dominant or '0.' Bits shown with a thick line on their upper line in FIG. 2 are transmitted in the frame 450 as recessive or '1.' Such bits, which are shown in FIG. 2 with a thick line, have a predetermined fixed or specified value in the frame 450.

The arbitration field 453 comprises an identifier of the frame 450 in the base ID field and in the ID-ext field. The identifier has 29 bits. An SRR bit and an IDE bit are provided between the base-ID field and the ID-ext field. An RRS bit is arranged at the end of the arbitration field 453.

The control field 454 begins with an FDF bit, followed by a res bit. These are followed by a BRS bit and an ESI bit. The control field 454 ends with a DLC field in which the length of the following data field 455 is encoded. The res bit must be sent for the frame 450 with a logical value 0, in other words as (logical) 0, i.e. dominant. However, if the subscriber station 20 receives a res bit having a logical value 1, in other words as (logical) 1, i.e. recessive, the receiving subscriber station 20 will see a protocol exception event PAE and go into the state or into the operating mode of re-integration.

The data field 455 will not be present if the DLC field of the control field 453 has the value 0. The data field 455 has a length corresponding to the value encoded in the DLC field. The value can be up to 64 bytes, as mentioned above.

The checksum field 456, in a field SBC, contains the number of stuff bits modulo 8 which have been inserted into the frame 450 according to the bit stuffing rule, specifically that following five identical bits, a bit inverse thereto is to be inserted in each case. In addition, the checksum field 456, in a CRC field, contains a CRC checksum and, following this, ends with a CRC delimiter CRC-Del.

The confirmation field 457 contains a bit ACK-Slot in which subscriber stations, which currently are only receivers of the frame 450 but not transmitters of the frame, can confirm or not confirm the correct reception of the frame 450 from the bus 40. The confirmation field 457 ends with a bit ACK-Del, which is also called an ACK delimiter.

A bit sequence is provided in the end of frame field EOF, which bit sequence marks the end of the frame 450. The bit sequence of the end field (EOF) thus serves to mark the end of the frame 450. The end field (EOF), together with the ACK delimiter, ensures that a number of 8 recessive bits is transmitted at the end of the frame 450. This is a bit sequence that cannot occur within the frame 450. As a result, the end of the frame 450 can be reliably detected by the subscriber stations 10, 20, 30.

After the end field (EOF), an interframe space (IFS), not shown in FIG. 2, follows in the frame 450. In the case of CAN FD, this interframe space (IFS) is designed in accordance with ISO 11898-1:2015. The interframe space (IFS) has at least 3 bits.

Otherwise, the fields and bits mentioned are from ISO 11898-1:2015 and for this reason are not described in more detail here.

In the case of CAN FD, in the arbitration phase 451, with the aid of an identifier (ID) with e.g. bits ID28 to ID18 in the arbitration field 453, negotiation takes place bit by bit between the subscriber stations 10, 20, 30 as to which subscriber station 10, 20, 30 wishes to send the message 45, 46 with the highest priority and will therefore receive exclusive access to the bus 40 of the bus system 1 next time for transmission in the subsequent data phase 452. A physical layer such as in CAN and CAN FD is used in the arbitration phase 451. The physical layer corresponds to the bit transmission layer or layer 1 of the conventional OSI model (Open Systems Interconnection Model).

An important point during the phase 451 is that the conventional CSMA/CR method is used, which allows simultaneous access of the subscriber stations 10, 20, 30 to the bus 40 without the higher-priority message 45, 46 being destroyed. As a result, further bus subscriber stations 10, 20, 30 can be added relatively easily to the bus system 1, which is very advantageous.

The CSMA/CR method requires that there must be so-called recessive states on the bus 40, which can be overwritten by other subscriber stations 10, 20, 30 with dominant states on the bus 40. In the recessive state, high-impedance conditions prevail at the individual subscriber station 10, 20, 30, which in combination with the parasites on the bus circuit results in longer time constants. This leads to a limitation of the maximum bit rate of the present-day CAN-FD physical layer at currently about 2 megabits per second in real vehicle use. With the new CAN SIC physical layer, even 5 megabits per second and up to 8 megabits per second are possible.

In the data phase 452, in addition to a portion of the control field 454 of a frame 450, the useful data of the CAN FD frame 450 or of the message 45 are transmitted from the corresponding data field 455, as well as the associated checksum field 456. The switchover from the data phase 452 back to the arbitration phase 451 then takes place.

The subscriber station 10, as the transmitter of the message 45, 46, does not begin transmitting bits of the data phase 452 to the bus 40 until the subscriber station 10 as the transmitter has won the arbitration and the subscriber station 10 as transmitter thus has exclusive access to the bus 40 of the bus system 1 for transmitting. The same applies to the subscriber stations 20, 30 when they want to transmit a message 45 or 46 to the bus 40.

Figure 3:
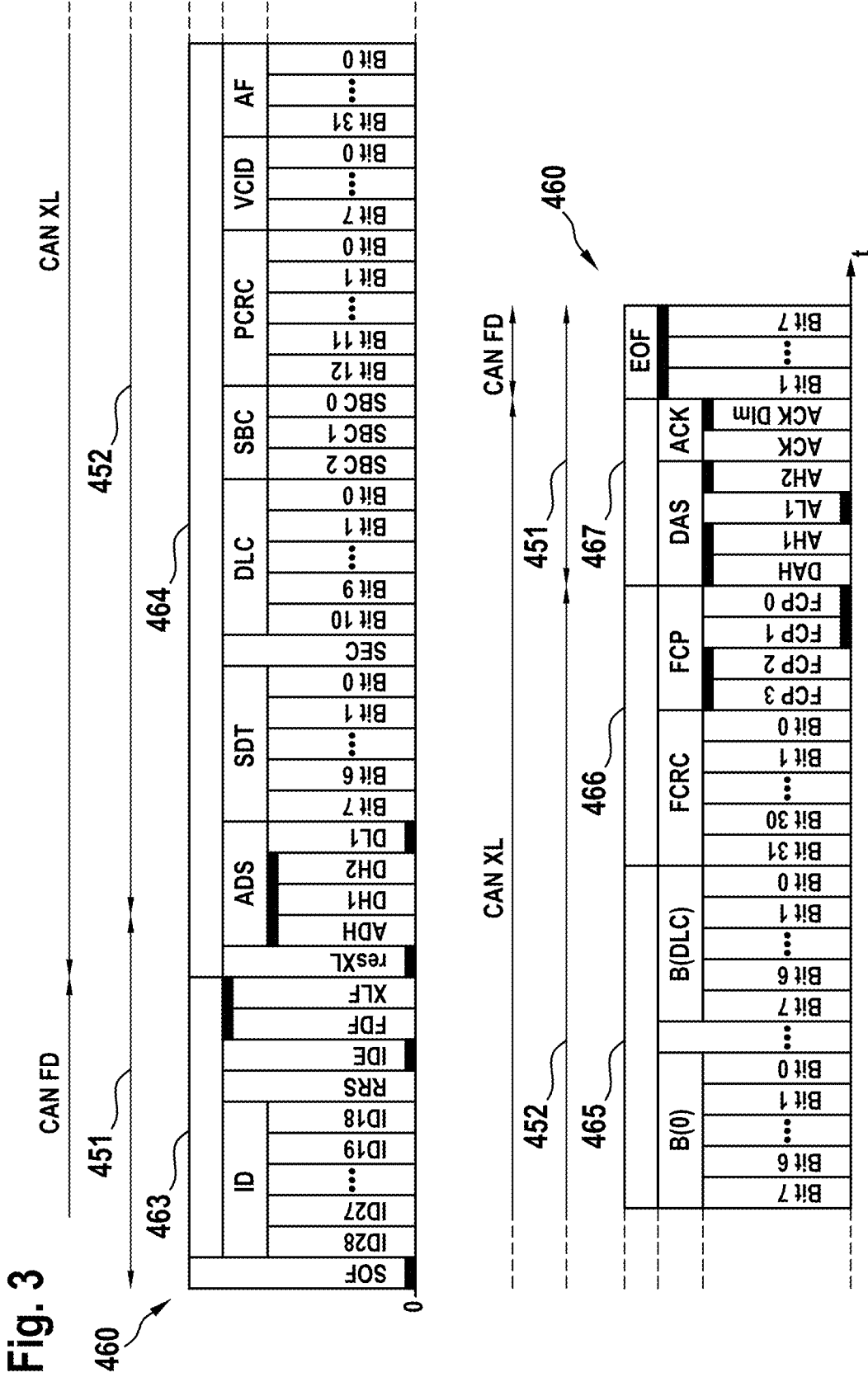
FIG. 3 shows the format of CAN XL frames according to the aforementioned standard CiA610-1 for a message which can be transmitted from a transmitting/receiving device for a subscriber station of the bus system according to the first exemplary embodiment of the present invention as an alternative to the CAN FD frame of FIG. 2.

FIG. 3 shows, for the message 46, a CAN XL frame 460 as is provided by communication control device 11, specifically encoded in a digital transmission signal TxD, for the transmitting/receiving device 12 for transmission to the bus 40. In this case, the communication control device 11 creates the frame 460 in the present exemplary embodiment as compatible with CAN FD, as also illustrated in FIG. 3. The same applies analogously to the communication control devices 31, 51 and the associated transmitting/receiving devices 32, 52 of the subscriber stations 30, 50.

According to FIG. 3, the CAN XL frame 460 is also divided for CAN communication on the bus 40 into different communication phases 451, 452, specifically the arbitration phase 451 and the data phase 452. Following a start bit (SOF), the frame 460 has an arbitration field 463, a control field 464 having an ADS field for a switchover between the communication phases 451, 452, a data field 465, a checksum field 466, and also a frame termination field 467. This is followed by the end of frame field EOF, as in the case of a frame 450 according to FIG. 2.

In the arbitration phase 451, the arbitration is also carried out for the frame 460 with the aid of the identifier (ID), as described above with reference to FIG. 2. In the data phase 452, in addition to a portion of the control field 464 of the frame 460, the useful data of the CAN XL frame 460 or of the message 46 are transmitted from the data field 465 as well as the checksum field 466. In the case of CAN XL according to FIG. 3, the DAS field then follows, which serves for switching from the data phase 452 back to the arbitration phase 451.

As shown in FIG. 3, in the arbitration phase 451 the subscriber station 10 uses as the first communication phase partially, in particular up to the FDF bit (inclusive), the format from CAN/CAN FD according to ISO 11898-1:2015, as shown and previously described in FIG. 2. In contrast, the subscriber station 10 uses as the second communication phase a CAN XL format, which is described below, from the FDF bit in the first communication phase as well as in the data phase 452. In the CAN XL data phase 452, symmetrical '1' and '0' levels are used for the transmission on the bus 40, rather than recessive and dominant levels as in CAN FD.

In general, two different stuffing rules are applied in the generation of the frame 460. Up until the FDF bit in the arbitration field 453, the dynamic bit stuffing rule of CAN FD applies, or for a frame 450 of FIG. 2, so that after 5 identical bits in succession, an inverse stuff bit is to be inserted. In the data phase 452 up to the FCP field a fixed stuffing rule applies, so that a fixed stuff bit inverse to the preceding bit must be inserted after a fixed number of bits. Alternatively, instead of only one stuff bit, a number of 2 or more bits can be inserted as fixed stuff bits.

In the present exemplary embodiment, the res bit from CAN FD, which is denoted by the XLF bit in the frame 460, is used for switching from the CAN FD format to the CAN XL format. For this reason, the frame formats of CAN FD and CAN XL are identical up to the res bit or XLF bit. A receiver can only identify at this bit the format in which the frame 460 is transmitted. A CAN XL subscriber station, i.e. in this case the subscriber stations 10, 30, also supports CAN FD. If the bit is transmitted as 1, i.e. recessive, it is the XLF bit and thus identifies the frame 460 as a CAN XL frame. For a CAN FD frame of FIG. 2, the communication control device 11 sets the bit as 0, i.e. as the dominant res bit.

After the XLF bit, a resXL bit follows in the frame 460, which is a dominant bit for future use. The resXL must be sent for the frame 460 as 0, i.e. dominant. However, if the subscriber station 10 receives a resXL bit as 1, i.e. recessive, the receiving subscriber station 10 will, for example, see a protocol exception event PAE, and proceed as in the case of a CAN FD message 46 for a res=1. If the resXL bit is not needed for synchronization from the recessive XLF bit to the dominant resXL bit, the resXL bit could be defined precisely the other way around, i.e. it must be sent as 1, i.e. recessive. In this case, in the case of a dominant resXL bit, the receiving subscriber station sees the protocol exception event PAE and changes its operating mode to re-integration.

The resXL bit is followed in the frame 460 by a sequence ADS (arbitration data switch) in which a predetermined bit sequence is encoded. This bit sequence permits a simple and reliable switching from the bit rate of the arbitration phase 451 (arbitration bit rate) to the bit rate of the data phase 452 (data bit rate). Optionally, within the ADH bit, the operating mode of the transmitting/receiving device 12, 32 is switched from the operating mode B_451 (SLOW) of the arbitration phase 451 into one of two operating modes B_452_TX, B_452_RX of the data phase 452. The two operating modes of the data phase 452 are an operating mode B_452_TX (FAST_TX) for a transmitting node that is allowed to transmit its signal to the bus 40 in the data phase 452, and an operating mode B_452_RX (FAST_RX) for a receiving node that is only the receiver of the signal from the bus 40.

Subsequent fields up to the beginning of the data field 465 are not described in more detail here. The data field 465 can have up to 2048 bytes.

The data field 465 is followed in the frame 460 by the checksum field 466 having a frame checksum FCRC and an FCP field. Here, FCP=frame check pattern. The FCP field consists of 4 bits, in particular having the bit sequence 1100. A receiving node uses the FCP field to check whether the receiving node is bit-synchronous with the transmission data stream. In addition, a receiving node synchronizes to the falling edge in the FCP field.

The FCP field is followed by the frame termination field 467. The frame termination field 467 consists of two fields, specifically the DAS field, and the confirmation field or ACK field having the at least one ACK bit and the ACK-Dlm bit.

The DAS field contains the DAS sequence (data arbitration switch) in which a predetermined bit sequence is encoded. This DAH, AH1, AL1 bit sequence permits a simple and reliable switchover from the data bit rate of the data phase 452 to the arbitration bit rate of the arbitration phase 451. In addition, during the DAS field, the operating mode of the transmitting/receiving device 12, 32 is optionally switched from one operating mode B_452_TX or B_452_RX (FAST) to the operating mode B_451 (SLOW). Within the DAH bit, the physical layer, i.e. the operating mode of the transmitting/receiving device 12, 32, is switched from FAST_TX or FAST_RX to SLOW. The AH1 bit is followed by the AL1 bit (logical 0) and the AH2 bit (logical 1). The two bits DAH and AH1 ensure that there is enough time for the operating mode switchover of the transmitting/receiving device 11, and that all subscriber stations 10, 30 see a recessive level of significantly more than one arbitration bit time before the edge at the beginning of the AL2 bit (logical 0). This ensures a reliable synchronization for the subscriber stations of the bus system.

In the frame termination field 467, the sequence of the DAS field is followed by the confirmation field (ACK). In the confirmation field, bits are provided for confirming or not confirming a correct reception of the frame 460.

In the frame 460, the frame termination field 467 is followed by the end of frame field (EOF=end of frame), as in the case of CAN FD according to FIG. 2.

For subscriber stations of which the error signaling is not activated and which transmit a CAN XL frame, the end of frame field (EOF) has a length which is different depending on whether a dominant bit or a recessive bit has been seen in the ACK bit. If the transmitting subscriber station has received the ACK bit as dominant, the end of frame field (EOF) will have a number of 7 recessive bits. Otherwise, the end of frame field (EOF) will only be 5 recessive bits long.

In the frame 450 the end of frame field (EOF) is followed by an interframe space (IFS), as previously explained with respect to the frame 450 of FIG. 2.

The following applies to CAN XL.

In contrast to CAN FD, the identifier ID of frame 460 in CAN XL is called "priority ID."

In contrast to CAN FD, CAN XL can send the RRS bit as (logical) 0 or as (logical) 1. In CAN FD, the RRS bit is always sent as logical 0.

For CAN XL, the bit rate in the data phase 452 must be at least a factor of 2 higher than the bit rate in the arbitration phase 451.

Figure 4:
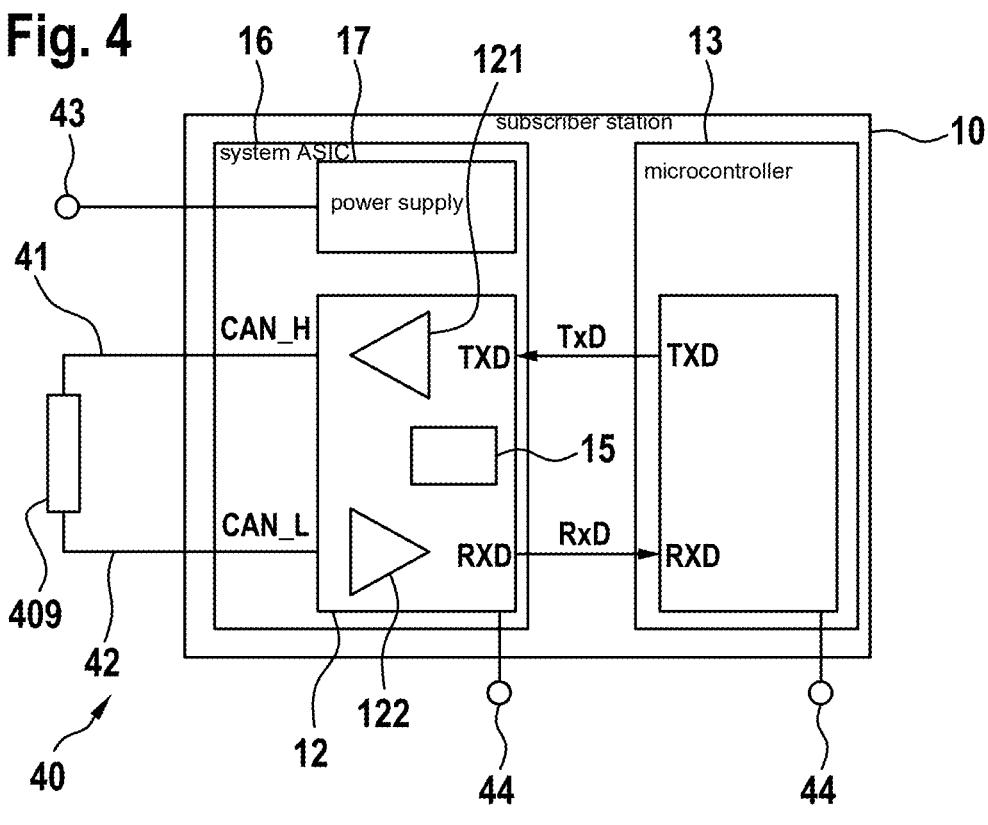
FIG. 4 shows a simplified schematic block diagram of a subscriber station of the bus system according to the first exemplary embodiment of the present invention.

FIG. 4 shows the basic structure of the subscriber station 10 comprising the communication control device 11, the transmitting/receiving device 12 and the wake-up module 15, which is part of the transmitting/receiving device 12. The subscriber station 30 is constructed in a similar manner, as shown in FIG. 4, but the wake-up module 35 according to FIG. 1 is arranged separately from the communication control device 31 and the transmitting/receiving device 32. For this reason, the subscriber station 30 is not described separately.

According to FIG. 4, the subscriber station 10 has, in addition to the communication control device 11, the transmitting/receiving device 12 and the wake-up module 15, a microcontroller 13 to which the communication control device 11 is assigned, and a system ASIC 16 (ASIC=application-specific integrated circuit), which can alternatively be a system basis chip (SBC) on which a plurality of functions necessary for an electronic module of the subscriber station 10 are combined. In the system ASIC 16, a power supply device 17 which supplies the transmitting/receiving device 12 with electrical energy is installed in addition to the transmitting/receiving device 12. The power supply device 17 usually supplies a voltage CAN_Supply of 5 V. Depending on requirements, however, the power supply device 17 can provide a different voltage with a different value. Additionally or alternatively, the power supply device 17 can be designed as a current source.

The transmitting/receiving device 12 also has a transmitting module 121 and a receiving module 122. Although reference is always made to the transmitting/receiving device 12 below, it is alternatively possible to provide the receiving module 122 in a separate device externally from the transmitting module 121. The transmitting module 121 and the receiving module 122 can be constructed as in a conventional transmitting/receiving device 22. The transmitting module 121 can in particular have at least one operational amplifier and/or a transistor. The receiving module 122 can in particular have at least one operational amplifier and/or a transistor.

The transmitting/receiving device 12 is connected to the bus 40, more specifically its first bus wire 41 for CAN_H and its second bus wire 42 for CAN_L. The voltage supply for the power supply device 17 for supplying the first and second bus wires 41, 42 with electrical energy, in particular with the voltage CAN-Supply, is effected via at least one terminal 43. The connection to ground or CAN_GND is realized via a terminal 44. The first and second bus wires 41, 42 are terminated with a terminating resistor 409.

In the transmitting/receiving device 12, the first and second bus wires 41, 42 are connected not only to the transmitting module 121, which is also referred to as a transmitter, but also to the receiving module 122, which is also referred to as a receiver, although the connection is not shown in FIG. 4 for the sake of simplicity.

During operation of the bus system 1, the transmitting module 121 can convert a transmission signal TXD of the communication control device 11, which is transmitted via terminals TXD, into corresponding signals CAN_H, CAN_L for CAN or CAN FD, and into signals CAN_XL_H, CAN_XL_L in the case of CAN XL, for the bus wires 41, 42, and transmits these signals to the bus 40 at the terminals for CAN_H and CAN_L. The digital transmission signal TxD is based on a CAN FD frame 450 of FIG. 2 or a CAN XL frame 460 of FIG. 3, as previously mentioned.

Figure 5:
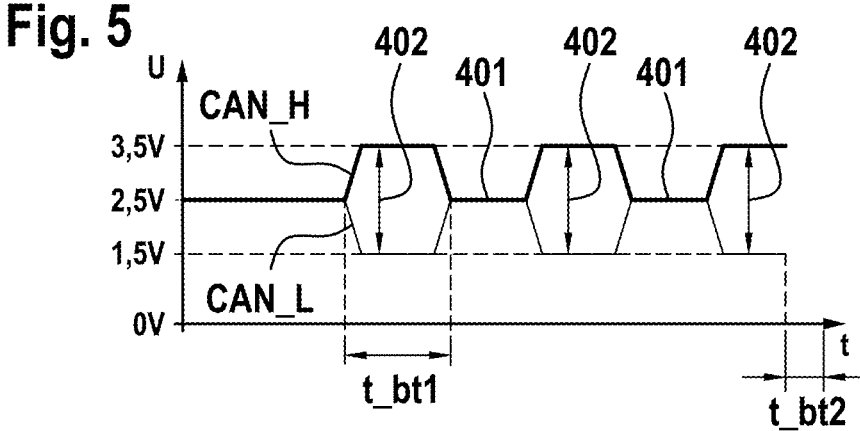
FIG. 5 shows a time profile of bus signals CAN_H and CAN_L at the subscriber station according to the first exemplary embodiment of the present invention.

From signals CAN_H and CAN_L received from the bus 40, which are shown in FIG. 5, the receiving module 122 forms a digital received signal RxD, and forwards it to the communication control device 11, as shown in FIG. 4.

Figure 6:
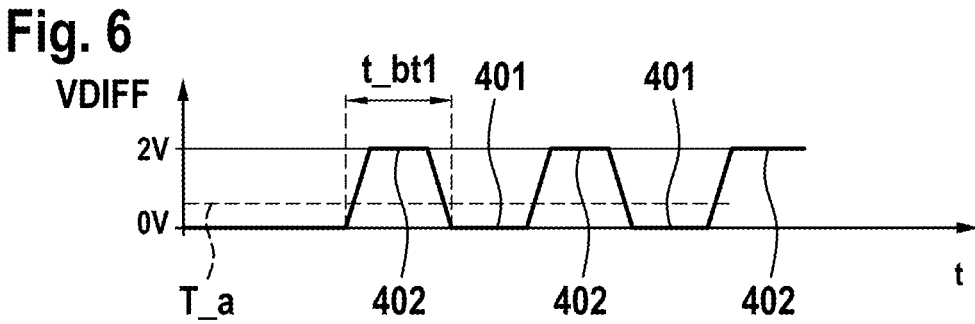
FIG. 6 shows a time profile of a differential voltage VDIFF of bus signals CAN_H and CAN_L at the subscriber station according to the first exemplary embodiment of the present invention.

According to the example of FIG. 5, the signals CAN_H and CAN_L have, at least in the arbitration phase 451, the dominant and recessive bus levels 401, 402, as from CAN. A difference signal VDIFF=CAN_H−CAN_L, which is shown in FIG. 6 for the arbitration phase 451, is formed on the bus 40. To detect the individual bits of the signal VDIFF with the bit time t_bt1, the receiving module 122 uses a receiving threshold T_a of, for example, 0.7 V in the arbitration phase 451. In the data phase 452, the bits of the signals CAN_H and CAN_L can be transmitted faster, i.e. with a shorter bit time t_bt2, than in the arbitration phase 451. In CAN FD and CAN XL, the signals CAN_H and CAN_L thus differ in the data phase 452 from the conventional signals CAN_H and CAN_L, at least in terms of their faster bit rate. Depending on requirements, the receiving module 122 uses at least one different receiving threshold in the data phase 452 than in the arbitration phase 451.

The sequence of the states 401, 402 for the signals CAN_H, CAN_L in FIG. 5 and the resulting profile of the voltage VDIFF of FIG. 6 serves only to illustrate the function of the subscriber station 10. The sequence of the data states for the bus states 401, 402 can be selected as required.

In other words, the transmitting module 121, when it is switched into a first mode of operation B_451 (SLOW), according to FIG. 5 generates a first data state as bus state 402 having different bus levels for two bus wires 41, 42 of the bus line and a second data state as bus state 401 having the same bus level for the two bus wires 41, 42 of the bus line of the bus 40.

In addition, in a second operating mode B_452_TX (FAST_TX), which includes the data phase 452, the transmitting module 121 transmits the bits at a higher bit rate to the bus 40 for the time profiles of the signals CAN_H, CAN_L in CAN FD and CAN XL. In the data phase 452 of CAN XL, the CAN_H and CAN_L signals can also be generated with a physical layer different from that in CAN FD. As a result, the bit rate in the data phase 452 can be increased even further than in the case of CAN FD. At least in the case of CAN XL, a subscriber station (receiving node) will set a third operating mode B_452_RX (FAST_RX) in its transmitting/receiving device if this subscriber station is not a transmitter of the frame 450 in the data phase 452, i.e. is not a transmitting node.

In one operating mode B_LB (idle), the communication control device 11 is switched to the idle or standby state. That is to say, the communication control device is waiting for the reception of a message 45, 46. In this state, no communication takes place on the bus 40. In other words, no signal is received at the RxD terminal of the communication control device 11 of FIG. 4, or the value logical 1 is present, since the recessive level on the bus 40 corresponds to a bit value=1 or to a logical 1 in the received signal RxD.

The mode of operation of the wake-up module 15, which differs from current communication standards for Classical CAN, for CAN FD and for CAN XL, is also described below with reference to FIG. 7.

Figure 7:
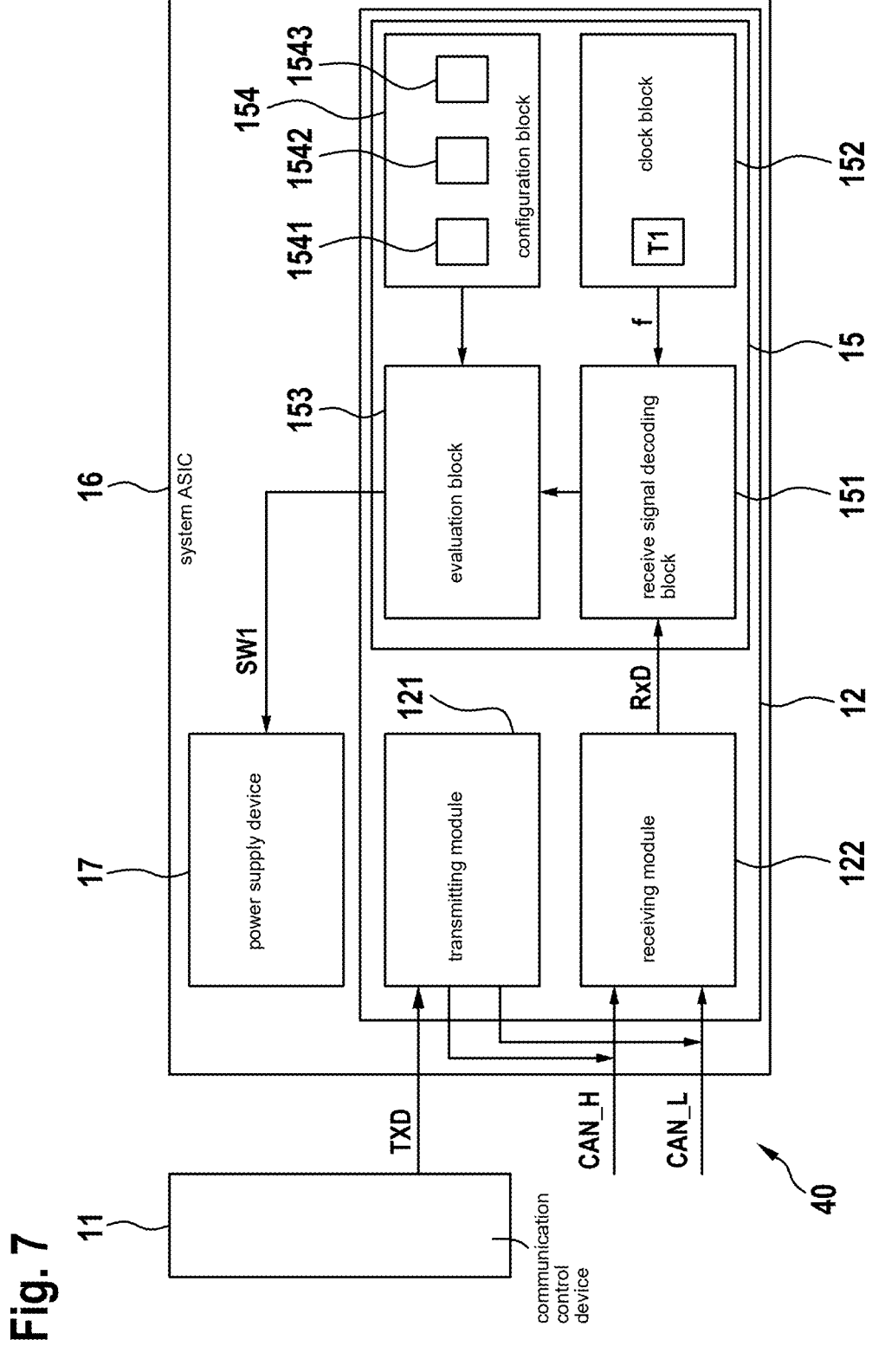
FIG. 7 shows a more detailed block diagram of the subscriber station of FIG. 4 to illustrate the structure of its wake-up module.

FIG. 7 shows the basic structure of the wake-up module 15 for the transmitting/receiving device 12 of the subscriber station 10. In FIG. 7, only the signals and blocks relevant to the wake-up module 15 are shown, as follows. The wake-up module 15 has a received signal decoding block 151, a clock block 152, an evaluation block 153 and a configuration block 154.

The clock block 152 outputs a clock T1 with the frequency f to the received signal decoding block 151. The evaluation block 153 can output a signal SW1 to the power supply device 17.

During operation of the bus system 1, the subscriber station 10 can be put into a sleep mode by a frame 49, as previously mentioned. In other words, the subscriber station 10 is put to sleep with a frame 49. The evaluation of whether a frame 49 for putting to sleep has been received can be carried out by software which is implemented in particular in the evaluation block 153 or a block which is not shown.

In sleep mode, the transmitting module 121 of the transmitting/receiving device 12 is deactivated. In sleep mode, the transmitting/receiving device 12 does not drive the signals CAN_H and CAN_L to the bus 40.

To detect when sleep mode is to be exited again, the wake-up module 15 proceeds as follows.

The receiving module 122 decodes the digital received signal RxD from the signals CAN_H and CAN_L using a receiving threshold, as already described above. The receiving module 122 outputs the digital received signal RxD to the received signal decoding block 152.

The received signal decoding block 151 decodes the digital bit stream in the received signal RxD and outputs the result to the evaluation block 153. The received signal decoding block 151 uses the clock T1 received from the clock block 152 to decode the bit stream.

The evaluation block 153 is configured to filter and compare the result received from the block 151. The evaluation block 153 evaluates whether the CAN frame 45, 46, 47, 48, 49 received from the bus 40 corresponds to the previously defined format for the wake-up frame 48. For this purpose, the evaluation block 153 uses at least one of the wake-up conditions 1541, 1542, 1543 stored in the configuration block 154. For example, the wake-up conditions 1541, 1542, 1543 can comprise at least one of the following conditions/parameters, specifically the identifier ID (priority ID) of the wake-up frame 48, a value for the RRS bit, a combination of the identifier ID (priority ID) of the wake-up frame 48 and the value for the RRS bit. Of course, other or additional conditions/parameters 1541, 1542, 1543 can be used.

For the evaluation of the block 153, the block 151 decodes a CAN XL frame 460 in an incoming received signal RxD up to the bit resXL (FIG. 3). Alternatively, the block 151 decodes a CAN XL frame 460 in the incoming received signal RxD only up to the bit RRS.

The evaluation block 153 detects up to the bit resXL (FIG. 3) whether it is a wake-up frame 48 or not.

If the evaluation of the evaluation block 153 shows that the CAN frame 45, 46, 47, 48, 49 received from the bus 40 corresponds to the previously defined format for the wake-up frame 48, the evaluation block 153 outputs a corresponding signal SW1 to the power supply device 17. The signal SW1 can, for example, be a switching signal configured to switch on the power supply device 17.

The evaluation block 153 can also be configured to evaluate, by filtering and comparing the result received from the block 151, whether the CAN frame 45, 46, 47, 48, 49 received from the bus 40 corresponds to the previously defined format for a sleep frame 49. For this purpose, the evaluation block 153 uses at least one of the parameters 1541, 1542, 1543 stored in the configuration block 154. For example, the parameters 1541, 1542, 1543 can comprise at least one of the following parameters, specifically the identifier ID (priority ID) of the sleep frame 49, a value for the RRS bit, a combination of the identifier ID (priority ID) of the sleep frame 49 and the value for the RRS bit. Of course, other or additional parameters 1541, 1542, 1543 can be used.

If the evaluation of the evaluation block 153 shows that the CAN frame 45, 46, 47, 48, 49 received from the bus 40 corresponds to the previously defined format for the sleep frame 49, the evaluation block 153 outputs a corresponding signal SW1 to the power supply device 17. The signal SW1 can, for example, be a switching signal configured to switch off the power supply device 17.

If the transmitting/receiving device 12 is in sleep mode, the transmitting/receiving device 12, in particular its wake-up module 15, detects whether it should wake up, for example as follows.

Accordingly, the evaluation block 153 evaluates incoming CAN XL frames 460 or the corresponding received signal RxD only up to the bit resXL (FIG. 3), which is previously described with reference to FIG. 3. Alternatively, the evaluation block 153 only performs an evaluation up to the bit RRS (FIG. 3).

The evaluation block 153 detects up to the bit resXL, i.e. before the data field 465, whether it is a wake-up frame 48 or not. Detection is based on one of the following conditions:

a). the value of the bit RRS, which is logical 0 or logical 1 b). the value of the priority ID.

According to a first modification of the evaluation block 153, the evaluation block 153 is configured to evaluate the combination of the aforementioned conditions a) and b) in order to detect whether or not it is a wake-up frame 48.

According to a second modification of the evaluation block 153, the evaluation block 153 only outputs the signal SW1 for switching on the power supply device 17 when the evaluation block 153 has received the wake-up frame 48 N times within or after the expiration of a predetermined time period. N is a natural number greater than 1, in particular 2 or any other natural number greater than 1. The predetermined time period is in particular 3 ms or any other time period. N and the predetermined time period are parameters of the parameters 1541, 1542, 1543 stored in the configuration block 154.

If CAN FD communication takes place on the bus 40 instead of CAN XL communication, the wake-up module 25 of the subscriber station 20 can also be put to sleep or woken up, as described in the ISO standard 11898-2:2016. For this purpose, the wake-up module 25 is partially identical in structure to the wake-up module 15. However, the configuration of the configuration block 154 is different than previously described with respect to the wake-up module 15.

However, the wake-up module 25 can additionally have a design and configuration as described below.

In the case of the subscriber station 20, the wake-up module 25 proceeds as follows to check whether the subscriber station 20 should be put to sleep or woken up, as specified in the standard ISO 11898-2:2016. Accordingly, the wake-up module 25 can be configured to check the following for a wake-up:

whether the CAN identifier, which can also be referred to as the frame identifier, of the received frame 45, 46, 48, 49 corresponds to the CAN identifier specified for the wake-up frame 48.

whether the data length of the received frame 45, 46, 48, 49 in the DLC code corresponds to the data length specified for the wake-up frame 48.

whether the data mask of the received frame 45, 46, 48, 49 corresponds to the data mask or the '1' bits in the data field 455 of the wake-up frame 48, at which the subscriber station 20 is to wake up.

If the wake-up module 25 determines that all of the above conditions are met for the received frame 45, 46, 48, 49, i.e. a frame 48 was received, the wake-up module 25 carries out the wake-up. As a result, the transmitting module 121 is reactivated. The method is described in more detail in the standard ISO 11898-2:2016.

Figure 8:
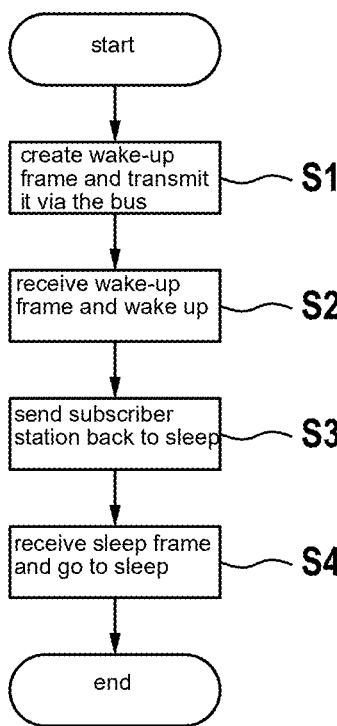
FIG. 8 shows a flow chart of a method which can be carried out in the bus system according to a second exemplary embodiment of the present invention.

FIG. 8 illustrates a second exemplary embodiment of the bus system 1, in which the transmitting/receiving devices 10, 30, 50, in particular their wake-up modules 15, 35, 55, are configured for a selective wake-up which is emulated in software. In addition, it is assumed below that the subscriber station 20 is also configured to transmit and receive CAN XL frames. Alternatively, at least one additional other subscriber station 10 and/or at least one additional CAN FD subscriber station 20 can be present. The subscriber station 50 is the management subscriber station which uses only one condition, in particular the RRS bit, to detect a wake-up frame 48.

In this case, the following sequence may occur.

1. All subscriber stations 10, 20, 30, 50 on the bus 40 are awake and communicating.
2. The subscriber station 50 puts the subscriber stations 20, 30 to sleep using a CAN XL frame, specifically a sleep frame 49.
3. The subscriber stations 10, 50 can continue to communicate without the subscriber stations 20, 30 waking up.
4. A while later, the function of the subscriber station 30 is required again, so that the subscriber station 30 is to be woken up.

As a result, the subscriber station 50, in particular its wake-up module 55, carries out a method as shown in FIG. 8.

According to FIG. 8, after the method is started, the first step is step S1. In step S1, the subscriber station 50 creates a wake-up frame 48 for the subscriber stations 20, 30 and transmits it via the bus 40. In this example, the wake-up frame 48 is a CAN XL frame in which the bit RRS=1. The method then proceeds to step S2.

In step S2, the subscriber stations 20, 30 receive the wake-up frame 48, as previously described with reference to FIG. 7. As a result, the subscriber stations 20, 30 both wake up because their evaluation module 25, 30 detects the wake-up frame 48 by the value of the bit RRS, because RRS=1. The method then proceeds to step S3.

In step S3, the subscriber station 50 sends the subscriber station 20 back to sleep. For this purpose, the subscriber station 50 creates a sleep frame 49, as previously described, and transmits it via the bus 40. Thereafter, the method proceeds to step S4.

In step S4, the subscriber station 20 receives the sleep frame 49, as previously described with reference to FIG. 7. As a result, the power supply device 17 of the subscriber station 20 is deactivated and the subscriber station 20 goes to sleep. The subscriber stations 10, 30, 50 are awake and can communicate. The method is then terminated.

Alternatively, the method can return to step S1. According to another alternative, the method proceeds to another step in which the subscriber station 50 sends a wake-up frame 48 for waking up other subscriber stations of the bus system 1 or a sleep frame 49 for putting other subscriber stations of the bus system 1 to sleep.

The detection of the wake-up frame 48 only via the bit RRS is advantageous in that no separate frame 48 has to be transmitted.

Instead, the wake-up signaling is integrated into the next frame 460 which is transmitted anyway by simply transmitting the bit RRS appropriately, e.g. as RRS=1. This allows the transferable net data rate on bus 40 to be increased.

Figure 9:
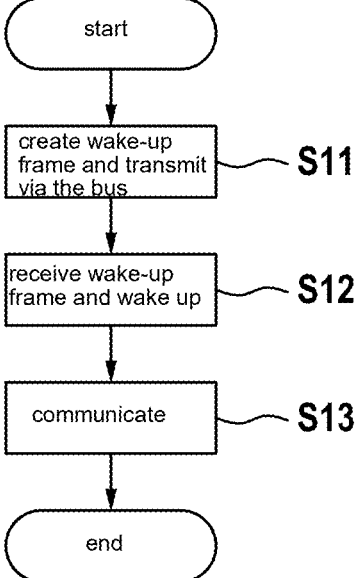
FIG. 9 shows a flow chart of a method which can be carried out in the bus system according to a third exemplary embodiment of the present invention.

FIG. 9 illustrates a third exemplary embodiment of the bus system 1, in which the transmitting/receiving devices 10, 30, 50, in particular their wake-up modules 15, 35, 55, are configured for (real) selective waking. In addition, it is again assumed that the subscriber station 20 is also configured to transmit and receive CAN XL frames. Alternatively, at least one additional subscriber station 10 can be present. The subscriber station 50 is the management subscriber station which uses two conditions, in particular the RRS bit and the priority ID, to detect a wake-up frame 48.

This can again result in sequences 1 to 4, which were previously described with reference to the second exemplary embodiment.

As a result, in the present exemplary embodiment, the subscriber station 50, in particular its wake-up module 55, carries out a method for selective wake-up as shown in FIG. 9.

According to FIG. 9, after the method is started, the first step is step S11. In step S11, the subscriber station 50 creates a wake-up frame 48 for the subscriber station 30 and transmits it via the bus 40. In this example, the wake-up frame 48 is a CAN XL frame in which the RRS bit=1 and the priority ID has the value expected by the wake-up module 35 according to the configuration in the configuration block 154 for a wake-up frame 48. Thereafter, the method proceeds to step S12.

In step S12, the subscriber station 30 receives the wake-up frame 48, as previously described with reference to FIG. 7. As a result, the subscriber station 30 wakes up because its evaluation module 25, 30 detects the wake-up frame 48 by the value of the bit RRS and the value of the priority ID. Thereafter, the method proceeds to step S13.

In step S13, the subscriber stations 10, 30, 50 are awake and can communicate. The method is then terminated.

Alternatively, the method can return to step S11. According to another alternative, the method proceeds to another step in which the subscriber station 50 sends a wake-up frame 48 for waking up other subscriber stations of the bus system 1 or a sleep frame 49 for putting other subscriber stations of the bus system 1 to sleep.

The detection of the wake-up frame 48 based on the priority ID (=11 bit frame ID=11 bit frame identifier) has the advantage that a selective wake-up of individual subscriber stations 10, 20, 30 is possible. The selective waking that is possible in this way avoids unnecessary waking and going back to sleep and the data traffic which this causes on the bus 40. This allows both the energy consumption of the bus system 1 to be minimized and the transferable net data rate on the bus 40 to be increased.

All previously described embodiments of the subscriber stations 10, 20, 30, of the bus system 1 and the method carried out therein can be used individually or in all possible combinations. In particular, all features of the previously described exemplary embodiments and/or their modifications can be combined as desired. Additionally or alternatively, the following modifications are possible in particular.

Even if the present invention is previously described using the example of the CAN bus system, the present invention can be used in any communication network and/or communication method in which two different communication phases are used in which the bus states generated for the different communication phases are different.

In particular, the bus system 1 according to the exemplary embodiments can be a communication network in which data can be transmitted in series at two different bit rates. It is advantageous, but not necessarily a prerequisite, for exclusive, collision-free access of a subscriber station 10, 20, 30 to a common channel to be ensured in the bus system 1, at least for certain time periods.

In the exemplary embodiments, the number and arrangement of the subscriber stations 10, 20, 30, 50 in the bus system 1 is arbitrary. In particular, the subscriber station 20 in the bus system 1 can be omitted. It is possible for one or more of the subscriber stations 10 or 30 to be present in the bus system 1. It is possible for all subscriber stations in the bus system 1 to be configured identically, that is to say only subscriber stations 10 or only subscriber stations 30 are present.

What is claimed is:

1. A transmitting/receiving device configured to selectively wake up a subscriber station of a serial bus system, comprising:

a transmitting module configured to transmit a transmission signal, which is created for communication in the bus system based on a frame, as an analog signal to the bus of the bus system;

a receiving module configured to receive an analog signal from the bus of the bus system and to generate a digital received signal from the analog signal received from the bus; and a wake-up module configured to wake up the subscriber station after the subscriber station has been put to sleep to save energy;

wherein the wake-up module is configured to evaluate at least one wake-up condition to decide whether or not the digital received signal corresponds to a wake-up frame which sends instructions to activate the transmitting module to wake up the subscriber station; and wherein the wake-up module is configured to make the decision as to whether or not the digital received signal corresponds to the wake-up frame before the receiving module serially forwards a data field encoded in the digital received signal for useful data of the frame to the wake-up module.

2. The transmitting/receiving device according to claim 1, wherein the at least one wake-up condition is a priority ID which determines a temporal priority with which the frame was allowed to be transmitted to the bus.

3. The transmitting/receiving device according to claim 1, wherein the at least one wake-up condition is an individual bit arranged directly after the priority ID in the frame.

4. The transmitting/receiving device according to claim 3, wherein the frame is a CAN XL frame and the individual bit is an RRS bit.

5. The transmitting/receiving device according to claim 1, wherein the wake-up module is configured to carry out the wake-up only when the wake-up module has evaluated that a wake-up frame was received with the serially received digital received signals N times in a predetermined period of time, wherein N is a natural number greater than 1.

6. The transmitting/receiving device according to claim 1, wherein the wake-up module includes:

a decoding block configured to decode the digital received signal output by the receiving module based on the frame, based on which the analog signal was created on the bus of the bus system; and an evaluation block configured to evaluate a result output by the decoding block as to whether or not the digital received signal corresponds to the wake-up frame.

7. The transmitting/receiving device according to claim 1, further comprising:

a configuration block storing the at least one wake-up condition, wherein the evaluation block is configured to carry out its evaluation by accessing the configuration block and to generate a signal for activating the power supply for the transmitting module when the digital received signal corresponds to the wake-up frame.

8. A subscriber station, comprising:

a transmitting/receiving device including:

a transmitting module configured to transmit a transmission signal, which is created for communication in the bus system based on a frame, as an analog signal to the bus of the bus system, a receiving module configured to receive an analog signal from the bus of the bus system and to generate a digital received signal from the analog signal received from the bus, and a wake-up module configured to wake up the subscriber station after the subscriber station has been put to sleep to save energy, wherein the wake-up module is configured to evaluate at least one wake-up condition to decide whether or not the digital received signal corresponds to a wake-up frame which sends instructions to activate the transmitting module to wake up the subscriber station, and wherein the wake-up module is configured to make the decision as to whether or not the digital received signal corresponds to the wake-up frame before the receiving module serially forwards a data field encoded in the digital received signal for useful data of the frame to the wake-up module; and a communication control device configured to sample and evaluate the digital received signal generated by the transmitting/receiving device according to a predetermined frame.

9. The subscriber station according to claim 8, wherein the communication control device is configured to control a communication of the subscriber station with at least one other subscriber station of the bus system and to evaluate the digital received signal, in which a bit time in a first communication phase can differ from a bit time in a second communication phase.

10. The subscriber station according to claim 9, wherein the communication control device is configured to, in the first communication phase, negotiate with the at least one other subscriber station as to which of subscriber station of the bus system will be given at least temporarily exclusive, collision-free access to the bus in a subsequent second communication phase.

11. The subscriber station according to claim 8, wherein the subscriber station is configured to transmit a wake-up frame to the bus of the bus system to selectively wake up at least one other subscriber station of the bus system after it has been put to sleep.

12. A bus system, comprising:

a bus;

a first subscriber station and a second subscriber station, each subscriber station of the first and second subscriber stations including:

a transmitting/receiving device including:

a transmitting module configured to transmit a transmission signal, which is created for communication in the bus system based on a frame, as an analog signal to the bus of the bus system, a receiving module configured to receive an analog signal from the bus of the bus system and to generate a digital received signal from the analog signal received from the bus, and a wake-up module configured to wake up the subscriber station after the subscriber station has been put to sleep to save energy, wherein the wake-up module is configured to evaluate at least one wake-up condition to decide whether or not the digital received signal corresponds to a wake-up frame which sends instructions to activate the transmitting module to wake up the subscriber station, and wherein the wake-up module is configured to make the decision as to whether or not the digital received signal corresponds to the wake-up frame before the receiving module serially forwards a data field encoded in the digital received signal for useful data of the frame to the wake-up module, and a communication control device configured to sample and evaluate the digital received signal generated by the transmitting/receiving device according to a predetermined frame;

wherein the first subscriber stations is configured to transmit a wake-up frame to the bus of the bus system to selectively wake up at least one other subscriber station of the bus system after it has been put to sleep; and wherein the second subscriber station is connected to the first subscriber station via the bus such that the first and second subscriber stations can communicate with each other serially.

13. A method for selectively waking up a subscriber station in a serial bus system, wherein the method is carried out using a transmitting/receiving device which has a transmitting module, a receiving module, and a wake-up module, wherein the method comprises the following steps:

transmitting, using the transmitting module, a transmission signal, which is created for communication in the bus system based on a frame, as an analog signal to the bus of the bus system;

receiving, using the receiving module, an analog signal from the bus of the bus system;

generating, using the receiving module, a digital received signal from the analog signal received from the bus;

waking up, using the wake-up module, the subscriber station after the subscriber station has been put to sleep to save energy;

wherein the wake-up module evaluates at least one wake-up condition in order to decide whether or not the digital received signal corresponds to a wake-up frame which sends instructions to activate the transmitting module to wake up the subscriber station; and wherein the wake-up module makes the decision as to whether or not the digital received signal corresponds to the wake-up frame before the receiving module serially forwards a data field encoded in the digital received signal for useful data of the frame to the wake-up module.

* * * * *